United States Patent
Friedlander et al.

(10) Patent No.: US 9,530,112 B2
(45) Date of Patent: Dec. 27, 2016

(54) COMMON CONDITIONS FOR PAST PROJECTS AS EVIDENCE FOR SUCCESS CAUSES

(71) Applicant: INTERNATIONAL BUSINESS MACHINES CORPORATION, Armonk, NY (US)

(72) Inventors: Robert R. Friedlander, Southbury, CT (US); James R. Kraemer, Santa Fe, NM (US); Elizabeth V. Woodward, Cedar Park, TX (US); Shunguo Yan, Austin, TX (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 541 days.

(21) Appl. No.: 13/864,898

(22) Filed: Apr. 17, 2013

(65) Prior Publication Data
US 2014/0316860 A1    Oct. 23, 2014

(51) Int. Cl.
*G06Q 10/00* (2012.01)
*G06Q 10/06* (2012.01)

(52) U.S. Cl.
CPC .................. *G06Q 10/0639* (2013.01)

(58) Field of Classification Search
CPC ......... G06Q 10/00–50/00; G06Q 90/00–99/00
See application file for complete search history.

(56) References Cited

U.S. PATENT DOCUMENTS

| | | | |
|---|---|---|---|
| 5,613,113 A * | 3/1997 | Goldring | |
| 7,216,088 B1 * | 5/2007 | Chappel et al. | 705/7.17 |
| 7,236,940 B2 * | 6/2007 | Chappel | 705/7.31 |
| 7,313,531 B2 * | 12/2007 | Chappel et al. | 705/7.17 |
| 7,346,533 B1 * | 3/2008 | Creel et al. | 705/7.17 |
| 7,366,680 B1 * | 4/2008 | Creel et al. | 705/7.17 |
| 8,374,905 B2 | 2/2013 | Graham et al. | |
| 2002/0049621 A1 * | 4/2002 | Bruce | 705/7 |
| 2002/0143599 A1 * | 10/2002 | Nourbakhsh et al. | 705/9 |
| 2002/0156668 A1 * | 10/2002 | Morrow et al. | 705/8 |

(Continued)

OTHER PUBLICATIONS

Engwall, Mats. "No project is an island: linking projects to history and context." Research policy 32.5 (2003): 789-808.*

(Continued)

*Primary Examiner* — Alan S Miller
(74) *Attorney, Agent, or Firm* — Heslin Rothenberg Farley & Mesiti P.C.; George Blasiak

(57) ABSTRACT

A processor-implemented method, system, and/or computer program product identifies a cause of a level of success in multiple projects from a set of past projects. Multiple artifacts describe conditions associated with each project from a set of past projects, where a cause for a level of success in the past projects is initially unknown. Logic identifies a set of common artifacts in multiple projects from the set of past projects, where the set of common artifacts describes common conditions that are common to all of the multiple projects. Additional logic identifies a level of success experienced by each of the multiple projects. In response to a particular set of projects having a same level of success, common conditions identified by the set of common artifacts are identified as the cause for the same level of success experienced by all of the projects in the particular set of projects.

20 Claims, 4 Drawing Sheets

(56) References Cited

U.S. PATENT DOCUMENTS

| | | | | |
|---|---|---|---|---|
| 2003/0135399 | A1* | 7/2003 | Ahamparam et al. | 705/7 |
| 2003/0225748 | A1* | 12/2003 | Haeberle | 707/3 |
| 2004/0230652 | A1* | 11/2004 | Estrada et al. | 709/204 |
| 2005/0060213 | A1* | 3/2005 | Lavu et al. | 705/7 |
| 2005/0114829 | A1* | 5/2005 | Robin et al. | 717/101 |
| 2005/0240561 | A1* | 10/2005 | Jain et al. | 707/1 |
| 2005/0278209 | A1* | 12/2005 | Kayahara et al. | 705/8 |
| 2006/0026251 | A1* | 2/2006 | Cheng et al. | 709/207 |
| 2006/0041440 | A1* | 2/2006 | Cheng et al. | 705/1 |
| 2007/0124186 | A1* | 5/2007 | Virine | 705/8 |
| 2008/0059279 | A1* | 3/2008 | Goldschneider et al. | 705/10 |
| 2008/0059516 | A1* | 3/2008 | Cui et al. | 707/103 R |
| 2008/0065448 | A1* | 3/2008 | Hull et al. | 705/8 |
| 2009/0006173 | A1* | 1/2009 | Farrell et al. | 705/9 |
| 2009/0164496 | A1* | 6/2009 | Carnathan et al. | 707/102 |
| 2009/0240549 | A1* | 9/2009 | Slawson et al. | 705/9 |
| 2009/0254399 | A1* | 10/2009 | Cristol | 705/8 |
| 2010/0023920 | A1* | 1/2010 | Chaar et al. | 717/102 |
| 2010/0070881 | A1* | 3/2010 | Hanson et al. | 715/753 |
| 2010/0088139 | A1* | 4/2010 | Rahi et al. | 705/8 |
| 2010/0122238 | A1* | 5/2010 | Kannan et al. | 717/123 |
| 2010/0332278 | A1* | 12/2010 | Stern et al. | 705/9 |
| 2011/0054968 | A1* | 3/2011 | Galaviz | 705/7.28 |
| 2011/0145034 | A1* | 6/2011 | Moore | 705/7.17 |
| 2011/0230229 | A1* | 9/2011 | Das et al. | 455/550.1 |
| 2011/0270853 | A1* | 11/2011 | Curbera et al. | 707/755 |
| 2011/0313932 | A1* | 12/2011 | Bhandar et al. | 705/301 |
| 2012/0072260 | A1* | 3/2012 | Graham et al. | 705/7.32 |
| 2012/0197674 | A1* | 8/2012 | Rahmouni et al. | 705/7.11 |
| 2012/0254710 | A1* | 10/2012 | Flanagan et al. | 715/202 |
| 2013/0024231 | A1* | 1/2013 | Gordon et al. | 705/7.17 |
| 2013/0132440 | A1* | 5/2013 | Carlson et al. | 707/792 |
| 2013/0145300 | A1* | 6/2013 | Mackay et al. | 715/772 |
| 2013/0218626 | A1* | 8/2013 | Duquette et al. | 705/7.23 |
| 2014/0067455 | A1* | 3/2014 | Zhang et al. | 705/7.24 |
| 2014/0075364 | A1* | 3/2014 | Bragdon et al. | 715/772 |

OTHER PUBLICATIONS

Cooper, Kenneth G., James M. Lyneis, and Benjamin J. Bryant. "Learning to learn, from past to future." International journal of project management 20.3 (2002): 213-219.*

Schindler, Martin, and Martin J. Eppler. "Harvesting project knowledge: a review of project learning methods and success factors." International journal of project management 21.3 (2003): 219-228.*

Richard Heeks, "Egovernment for Development: Success and Failure in Egovernment Projects", University of Manchester, Manchester, United Kingdom, Last Updated Oct. 19, 2008, pp. 1-6, Retrieved Apr. 17, 2013.

Robert Goatham, (Ed.) "Why Projects Fail: 101 Common Causes", Calleam Consulting Ltd., pp. 1-5, Retrieved Apr. 17, 2013.

Lisa Anderson, "Top Three Causes of Project Failure", projecttimes.com, Last Modified Apr. 28, 2010, pp. 1-3, Retrieved Apr. 17, 2013.

Matt Asay, "62 Percent of IT Projects Fail. Why?", cnet.com, CBS Interactive Inc., Mar. 21, 2008, pp. 1-4.

Anonymous, "Strategies for Project Recovery", Project Management Solutions, Inc., 2011, pp. 1-8.

* cited by examiner

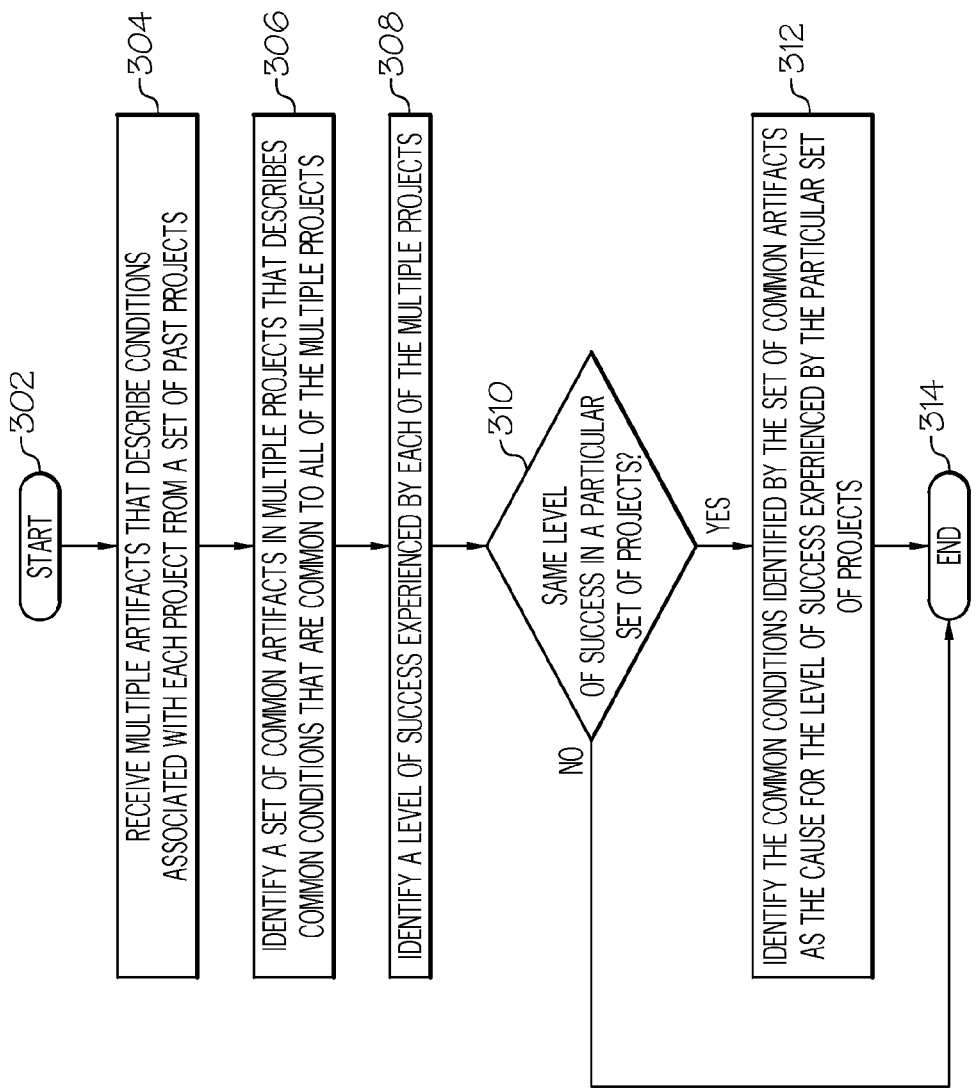

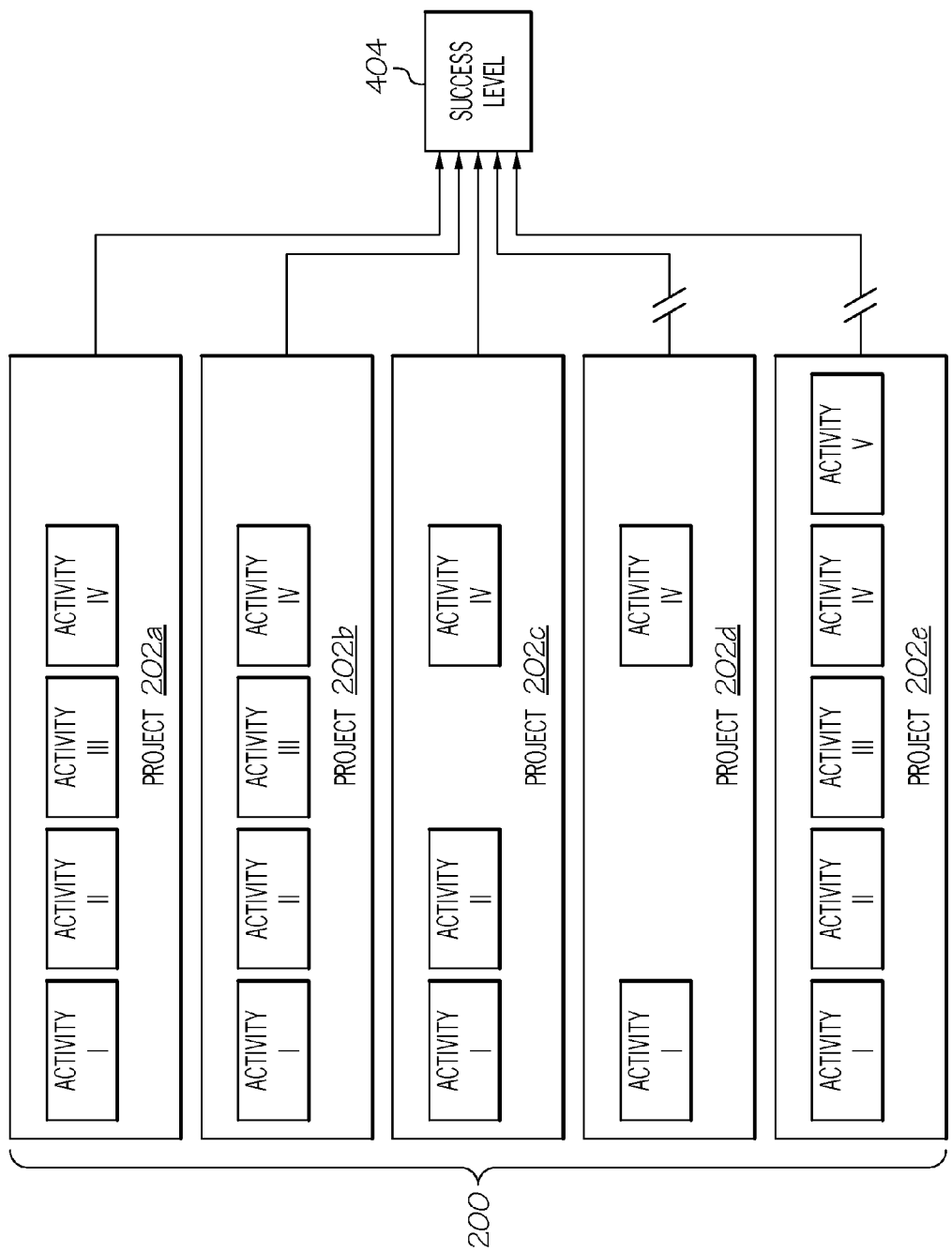

COMMON CONDITIONS FOR PAST PROJECTS AS EVIDENCE FOR SUCCESS CAUSES

BACKGROUND

The present disclosure relates to the field of computers, and specifically to the use of computers when managing projects. Still more particularly, the present disclosure relates to using historical chains of evidence from projects to determine a causation of the projects' level of success.

Projects are typically a series of one or more steps taken to achieve a final result. These steps are taken under certain conditions at the time of their performance. While some projects experience the same conditions during execution, others experience different conditions during their execution. Furthermore, various projects perform the same, more, or fewer steps during their execution.

SUMMARY

A processor-implemented method, system, and/or computer program product identifies a cause of a level of success in multiple projects from a set of past projects. Multiple artifacts describe conditions associated with each project from a set of past projects, where a cause for a level of success in the past projects is initially unknown. Logic identifies a set of common artifacts in multiple projects from the set of past projects, where the set of common artifacts describes common conditions that are common to all of the multiple projects. Additional logic identifies a level of success experienced by each of the multiple projects. In response to a particular set of projects having a same level of success, common conditions identified by the set of common artifacts are identified as the cause for the same level of success experienced by all of the projects in the particular set of projects.

BRIEF DESCRIPTION OF THE SEVERAL VIEWS OF THE DRAWINGS

FIG. 3 is a high-level flow chart of one or more steps performed by one or more processors to identify a cause of a level of success in multiple projects from a set of past projects; and FIG. 4 depicts a set of past projects and their steps.

DETAILED DESCRIPTION

Figure 1:
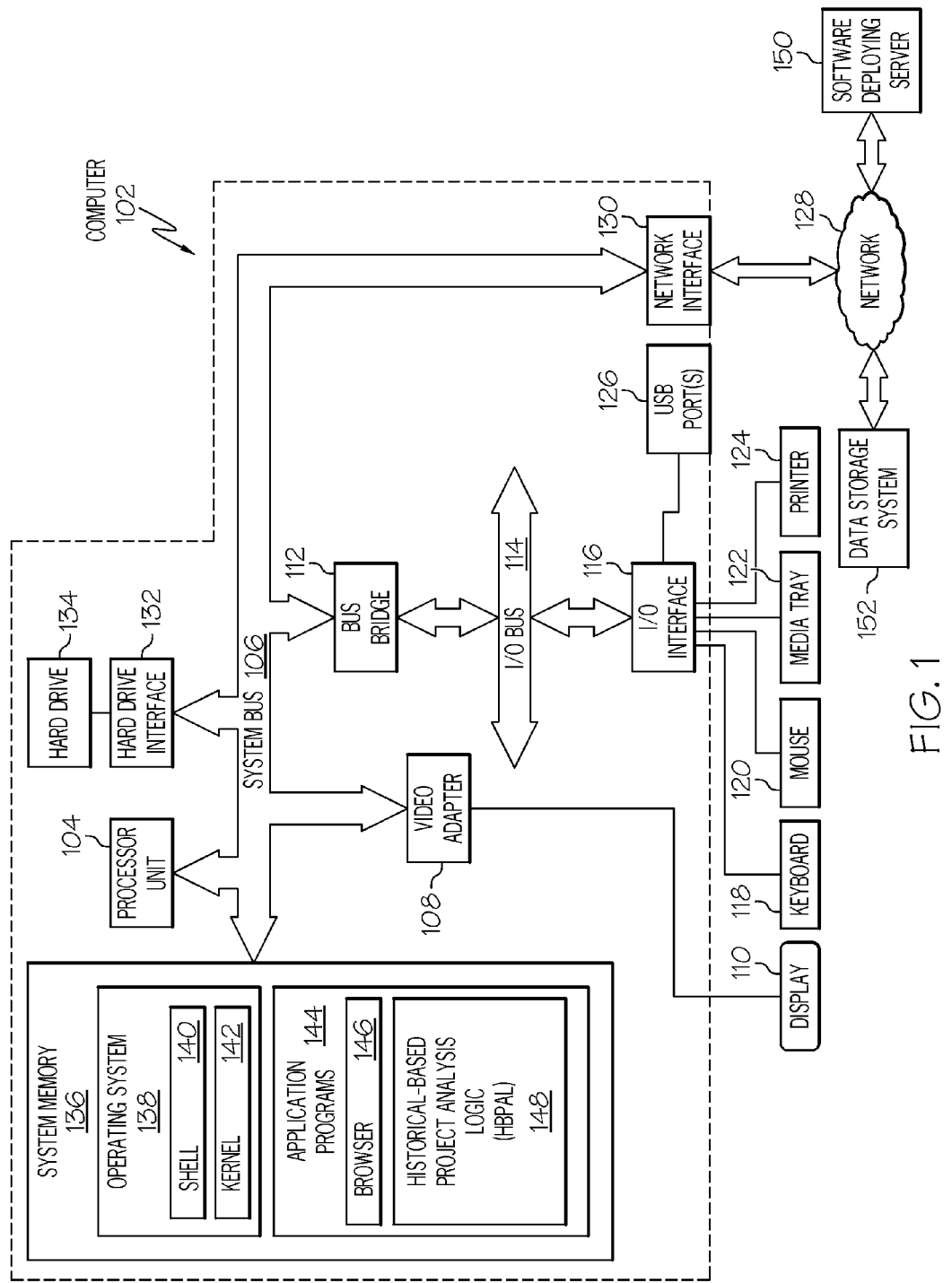
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 102 may be utilized by software deploying server 150 and/or a data storage system 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Historical-Based Project Analysis Logic (HBPAL) 148. HBPAL 148 includes code for implementing the processes described below, including those described in FIGS. 2-3. In one embodiment, computer 102 is able to download HBPAL 148 from software deploying server 150, including in an on-demand basis, wherein the code in HBPAL 148 is not downloaded until needed for execution. Note further that, in one embodiment of the present invention, software deploying server 150 performs all of the functions associated with the present invention (including execution of HBPAL 148), thus freeing computer 102 from having to use its own internal computing resources to execute HBPAL 148.

The data storage system 152 stores a set of data that describes past projects.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
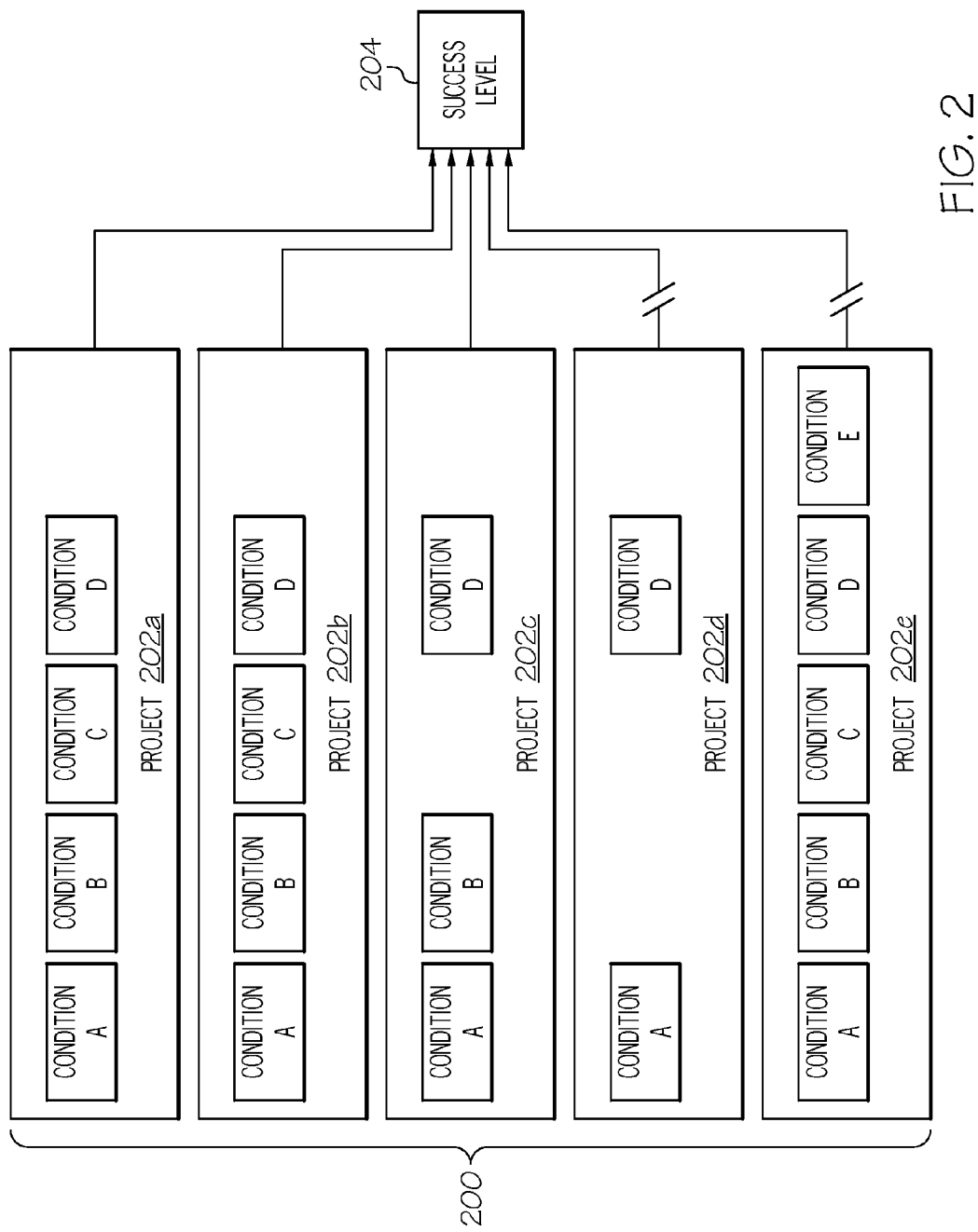
FIG. 2 illustrates a set of past projects and their conditions.

With reference now to FIG. 2, an exemplary illustration of a set of past projects 200 depicts various conditions experienced during their execution. All of the past projects 200 performed the same (or substantially similar) steps during their execution, but they may or not have experienced similar conditions during the execution of these steps. Examples of such conditions include, but are not limited to: use of a particular team of workers during some or all of the project; use of workers that hold a same combination of skills (i.e., each worker has one or more skill, and together the multiple workers hold a particular combination of skills); having a particular customer for a final product produced by the project; use of a same type of physical equipment when executing one or more steps in the project; frequency of communication between specific members of a team that is working on a particular project; methods of communication used by members of a team that is working on a particular project; work style (time of day worked, remote versus office, number of hours worked without breaks, break times, etc.) of members of a team that is working on a particular project; holding a set of chat sessions among specific workers on the project; use of particular practices in completing the project; team members' rating of their perceived skill in using specific practices; personality types of members of the team; governance requirements that apply to a particular project; societal or business events related to a particular project; etc. As a result of the steps performed by a particular project, and as a result of one or more conditions experienced during performance of the particular project, the project may or may not be successful, as depicted by certain arrows pointing to success level 204 while other arrows do not. In one embodiment, the success level 204 is defined by what percentage of predefined project goals are met upon completion of the project. For example, if there are 100 criteria that the project is designed to meet (i.e., producing a product with certain traits, by a certain date, within a certain budget, etc.), but a project only meets 80 of these criteria, then the project is deemed to be 80% successful (assuming that all criteria are equally weighted).

For example, consider project 202*a*, which experienced conditions A-D during its execution. By experiencing these conditions A-D, project 202*a* was able to reach a certain predetermined success level 204 (e.g., 95%). Project 202*b*, which experienced the same conditions A-D, was also able to reach success level 204. Similarly, project 202*c* was also able to reach success level 204, even though it did not experience condition C. Condition C may have been a detrimental condition (e.g., a massive power failure, labor strike, unexpected raw product interruption, etc.), or it may have been an advantageous condition (e.g., uninterrupted power supplies, plentiful labor sources, plentiful raw product supply, etc.). Note that project 202*d* was missing conditions B and C, and was unable to reach the success level 204. Similarly, project 202*e* had all of the same conditions A-D as successful projects 202*a*-202*b*, but project 202*e* also had a condition E (likely a detrimental condition), which prevented it from reaching the success level 204.

With reference now to FIG. 3, a high-level flow chart of one or more steps performed by one or more processors to identify a cause of a level of success in multiple projects from a set of past projects is presented. After initiator block 302, one or more processors receive a data stream that describes multiple artifacts (block 304). These multiple artifacts (e.g., data records) describe conditions associated with each project from a set of past projects. Note that a cause for a level of success in the past projects is initially unknown (e.g., when the data stream describing the multiple artifacts is received).

As described in block 306, a set of common artifacts in multiple projects from the set of past projects is then identified. As described herein, the set of common artifacts describes common conditions that are common to all of the multiple projects. For example, the common artifacts may be artifacts that describe Condition A, which is common to all of the projects 202*a*-202*e* depicted in FIG. 2. Examples of such common conditions include, but are not limited to: use of a same team of workers on all of the multiple projects; use of workers having a same skill combination on all of the multiple projects; a same customer for all of the multiple projects; use of a same type of physical equipment when executing all of the multiple projects; a series of chat sessions among a set of same workers who worked on all of the multiple projects; frequency of communication between specific members of a team that is working on a particular project; methods of communication used by members of a team that is working on a particular project; work style (time of day worked, remote versus office, number of hours worked without breaks, break times, etc.) of members of a team that is working on a particular project; holding a set of chat sessions among specific workers on the project; use of particular practices in completing the project; team members' rating of their perceived skill in using specific practices; personality types of members of the team; governance requirements that apply to a particular project; societal or business events related to a particular project; the same practices used for all of the multiple projects; the same set of governance requirements used for all of the multiple projects; etc.

With respect to block 308, a level of success experienced by each of the multiple projects is then identified. The level of success is defined by a percentage of predefined project goals that have been met by a particular project. For example, if a particular project meets 80% of its unweighted goals, then it has a higher level of success than another project (that is performing the same overall task and/or producing the same product) that only meets 70% of these unweighted goals.

As depicted in query block 310, a query is then made to identify which of the past projects have a same level of success. In one embodiment, projects from this particular set of projects have a level of success that is within a same range (e.g., meeting between 80%-100% of their goals). In another embodiment, the level of success is gauged by the degree that the project achieved a certain level (according to predetermined parameters) of customer and/or worker satisfaction; that the project delivered a certain level of revenue (i.e., made more than a predetermined amount of money for the enterprise that created the product and/or the enterprise that purchased/used the product); that the project resulted in fewer defects (i.e., the product itself had less than a predetermined number of defects, and/or the product (e.g., a software program used to control a computerized manufacturing machine that builds a manufactured product) caused less than a predetermined number of defective manufactured products); etc. In one embodiment. the level of success is gauged by the result of certain beta test results (i.e., tests performed on the product by volunteer users of the product), indicating the level of success in the product achieving certain predetermined goals according to surveys from the volunteer users, or that the project achieved a certain level of adoption (number of users, number of uses).

If a particular set of past projects have the same level of success, then common conditions (which are identified by the set of common artifacts) are identified/deemed as being the cause for the level of success experienced by all of the projects in that particular set of projects. That is, if a group of projects all have a same level of success, then the common conditions experienced during their execution are deemed to be the reason for their reaching the same level of success upon completion of the project. The process ends at terminator block 314.

In one embodiment, the similar conditions that are deemed relevant to the resulting level of success are a lineage (i.e., order) of activities performed by one or more projects. For example, consider FIG. 4, which depicts multiple past projects having various activities, even though each of the projects was for a same purpose. Note that multiple projects 200 are the same projects depicted in FIG. 2. However, the depicted activities I-V may or may not align with the conditions A-E depicted in FIG. 2. Furthermore, the depicted activities I-V shown in FIG. 4 may or may not be in the left-to-right sequence depicted in FIG. 4.

Thus, in one embodiment, consider project 202a and project 202b. Both of these projects performed the same activities I-IV to perform a same overall project (i.e., creating a particular type of product, delivering a particular type of service, etc.). By performing these activities I-IV, both project 202a and project 202b were able, upon completion and/or during intermediate period, to reach some predetermined success level 404, which may or may not be the same success level 204 depicted in FIG. 2. Thus, a lineage of activities (i.e., activities I-IV, executed in the same order or, in another embodiment, in a different order) shown in projects 202a and 202b shows a particular sequential order of activities associated with a particular project. In an embodiment in which these activities are performed/executed in this particular sequential order, the sequence is determined by a tracing of timestamps on artifacts (e.g., descriptive data) that describe the activities. Thus, any project executing activities I-IV (and under the same conditions as described in FIG. 4) will reach the same success level 404.

Note that even though project 202c did not execute activity III, it was still able to reach success level 404. However, project 202d (missing activities II and III) and project 202e (having an extra activity V) failed to reach the success level 404.

In one embodiment, the artifacts that describe one or more of the activities depicted in FIG. 4 are e-mails that are related to a same product/service being created/provided by the multiple projects 202a-202e. In one embodiment, these common artifacts are identified by the presence of a common addressee found in the e-mails. In one embodiment, these common artifacts are identified by the e-mails having a same (common) topic (e.g., found in a subject line in the e-mails by data mining the content of the e-mails). In one embodiment, the timestamps are timestamps of files in filesystems, content management systems or other repositories. In one embodiment, the timestamps are timestamps from social media exchanges, which determine a sequence of activities across multiple sources where there are references between disparate sources (email, twitter, blogs, white papers, etc.).

In one embodiment, a lineage of activities performed in each of the multiple projects is traced. Again, in one embodiment the lineage of activities is a particular sequential order of activities associated with a particular project. In this embodiment, however, the lineage of activities is traced from interim product announcements for a final product created by the multiple projects. That is, each of the projects 202a-202e may be creating a same final product. However, there may be the same or different interim product announcements about the final project/product. For example, an initial product announcement may announce that the final product will be available in one year, a next product announcement may announce that the final product will be pushed back another six months, and a final product announcement may come five years later. Such interim product announcements, and their timing, are used to identify features of various projects, which are then correlated to their respective final success levels.

In one embodiment, the lineage of activities is traced from a set of published videos describing intermediate stages (e.g., partially completed versions) of a final product. For example, videos may be posted on a public video posting website during the creation of the product. The content and/or timing of such video postings is then correlated with various success levels for the final project/product. For example, a high number of video postings within a short period of time is more indicative of a successful product/project than a sparse number of video postings about the product over a relatively longer period of time. That is, if numerous promotional videos are released within a short time period, in anticipation of a successful product, this is more indicative of a successful product than a scenario in which only a few videos are released (perhaps sporadically) over a longer period of time (since there is a question as to how successful the enterprise believes that the product will ultimately become).

In one embodiment, a lineage of the multiple projects is traced based on keywords from publications. Again, the lineage of activities is a particular sequential order of activities associated with a particular project. In this embodiment, the keywords describe a same final product that is created by each of the multiple projects. The keywords (e.g., "early", "late", "over budget", "numerous pre-orders", etc.) are found in publications that are published during execution of each of the multiple projects, and provide a means for correlating each project to a particular success level.

In one embodiment, related past projects are identified by their common usage of a same mathematical formula during one or more activities. In this embodiment, an activity lineage from the multiple projects is traced based on a specific mathematical formula. This specific mathematical formula was used in one or more activities during a creation of a same final product by each of the multiple projects. From this common usage of the same specific mathematical formula, the multiple projects that created the final product are identified.

Note that while the success level 204 and/or success level 404 are described above as reaching some predetermined level of success (e.g., 80%), in one embodiment success level 204 and/or success level 404 is more accurately a "failure level". That is, by setting the level at low point (e.g., less than 50% of the goals have been met), then the process described herein is able to identify model projects that are failures, not successes. Thus, projects that have similar conditions and/or activities, and result in failure, are deemed to be recurring project failures.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of identifying a cause of a level of success in multiple projects from a set of past projects, the method comprising:
receiving, by one or more processors, a data stream that describes multiple artifacts from disparate sources, wherein the multiple artifacts from disparate sources describe conditions associated with each project from a set of past projects, and wherein a cause for a level of success in the set of past projects is unknown at a time that the data stream is received;
identifying, by one or more processors, a set of common artifacts in multiple projects from the set of past projects, wherein the set of common artifacts describes common conditions that are common to all of the multiple projects;
identifying, by one or more processors, a level of success experienced by each of multiple projects, wherein the level of success is defined by a percentage of predefined project goals that have been met by a particular project; and
in response to one or more processors determining that a particular set of projects, from the multiple projects, has a same level of success within a predefined range, identifying, by one or more processors, common conditions identified by the set of common artifacts as the cause for the level of success experienced by all of the projects in the particular set of projects;
wherein the method includes tracing, by one or more processors, a lineage of activities performed on each of the multiple projects, wherein the lineage of activities is a particular sequential order of activities associated with a particular project, and wherein the lineage of activities is traced from timestamps on the multiple artifacts from disparate sources.

2. The method of claim 1, wherein one of the common conditions is a use of a same team of workers on the multiple projects.

3. The method of claim 1, wherein one of the common conditions is a same customer for the multiple projects.

4. The method of claim 1, wherein one of the common conditions is a series of chat sessions among a set of same workers who worked on all of the multiple projects.

5. The method of claim 1, wherein one of the common conditions is a frequency of communication between members of teams that worked on the multiple projects.

6. The method of claim 1, wherein one of the common conditions is a type of communication used by members of teams that worked on the multiple projects.

7. The method of claim 1, wherein one of the common conditions is a work style of workers from teams that worked on the multiple projects, wherein the work style describes a time of day worked, usage of remote facilities versus a local office, a number of hours worked without breaks, and break times of the workers that worked on the multiple projects.

8. The method of claim 1, wherein one of the common conditions is a set of governance requirements to which the multiple projects are required to comply.

9. The method of claim 1, further comprising:
identifying, by one or more processors, the particular set of projects from the multiple projects that have the same level of success within the predefined range as projects having a same lineage of activities.

10. The method of claim 9, wherein the multiple artifacts are e-mails that are related to a creation of a same product by each of the multiple projects, and wherein the multiple artifacts are identified by a common addressee to the e-mails.

11. The method of claim 9, wherein the multiple artifacts are e-mails that are related to a creation of a same product by each of the multiple projects, and wherein the multiple artifacts are identified by a common topic of the e-mails.

12. The method of claim 1,
wherein the lineage of activities is traced from interim product announcements for a final product created by the multiple projects; and wherein the method further includes
identifying, by one or more processors, the multiple projects that created the final product based on traced interim product announcements.

13. The method of claim 1,
wherein the lineage of activities is traced from a set of published videos describing intermediate stages of a final product, wherein the intermediate stages of the final product are created by each of the multiple projects; and wherein the method further includes
identifying, by one or more processors, the multiple projects that together created the final product based on the lineage of activities that is traced from the set of published videos.

14. The method of claim 1,
wherein the tracing, by one or more processors, a lineage of the multiple projects is based on keywords from publications, wherein the lineage of activities is a particular sequential order of activities associated with a particular project, wherein the keywords describe a final product created by each of the multiple projects, and wherein the publications are published during execution of the multiple projects; and wherein the method further includes
correlating, by one or more processors, a particular success level to each of the multiple projects that created the final product based on a traced lineage of publications that utilize the keywords.

15. The method of claim 1,
wherein the tracing, by one or more processors, an activity lineage from the multiple projects is based on a specific mathematical formula, wherein the specific mathematical formula was used in one or more activities during a creation of a same final product by each of the multiple projects; and wherein the method further includes
identifying, by one or more processors, the multiple projects that created the same final product based on a traced activity lineage of activities that used the specific mathematical formula.

16. The method of claim 1, wherein the same level of success within the predefined range describes a recurring project failure of the multiple projects.

17. The method of claim 1, wherein the lineage of activities identifies a sequential order for performance of the common conditions.

18. The method of claim 1, wherein the method includes using the lineage of activities for determining a success level.

19. A computer program product for identifying a cause of a level of success in multiple projects from a set of past projects, the computer program product comprising:
a computer readable storage medium;
first program instructions to receive a data stream that describes multiple artifacts from disparate sources, wherein the multiple artifacts from disparate sources describe conditions associated with each project from a set of past projects, and wherein a cause for a level of success in the set of past projects is unknown at a time that the data stream is received;
second program instructions to identify a set of common artifacts in multiple projects from the set of past projects, wherein the set of common artifacts describes common conditions that are common to all of the multiple projects;
third program instructions to identify a level of success experienced by each of the multiple projects, wherein the level of success is defined by a percentage of predefined project goals that have been met by a particular project; and
fourth program instructions, to in response to one or more processors determining that a particular set of projects, from the multiple projects, has a same level of success within a predefined range, identify the common conditions identified by the set of common artifacts as the cause for the level of success experienced by all of the projects in the particular set of projects;
fifth program instructions to trace a lineage of activities performed on each of the multiple projects, wherein the lineage of activities is a particular sequential order of activities associated with a particular project, and wherein the lineage of activities is traced from timestamps on the multiple artifacts from disparate sources; and
sixth program instructions to identify the particular set of projects from the multiple projects that have the same level of success within the predefined range as projects having a same lineage of activities;
seventh program instructions to further trace the activity lineage from the multiple projects based on a specific mathematical formula, wherein the specific mathematical formula was used in one or more activities during a creation of a same final product by each of the multiple projects; and
eighth program instructions to further identify the multiple projects that created the same final product based on a traced activity lineage of activities that used the specific mathematical formula; and wherein the first, second, third, fourth, fifth, sixth, seventh, and eighth program instructions are stored on the computer readable storage medium.

20. A computer system comprising:
a processor, a computer readable memory, and a computer readable storage medium;
first program instructions to receive a data stream that describes multiple artifacts from disparate sources, wherein the multiple artifacts from disparate sources describe conditions associated with each project from a set of past projects, and wherein a cause for a level of success in the set of past projects is unknown at a time that the data stream is received;
second program instructions to identify a set of common artifacts in multiple projects from the set of past projects, wherein the set of common artifacts describes common conditions that are common to all of the multiple projects;
third program instructions to identify a level of success experienced by each of the multiple projects, wherein the level of success is defined by a percentage of predefined project goals that have been met by a particular project; and
fourth program instructions, to in response to one or more processors determining that a particular set of projects, from the multiple projects, has a same level of success within a predefined range, identify the common conditions identified by the set of common artifacts as the cause for the level of success experienced by all of the projects in the particular set of projects;
fifth program instructions to trace a lineage of activities performed on each of the multiple projects, wherein the lineage of activities is a particular sequential order of activities associated with a particular project, and wherein the lineage of activities is traced from timestamps on the multiple artifacts, and wherein the timestamps include a timestamp of file from disparate sources; and
sixth program instructions to identify the particular set of projects from the multiple projects that have the same level of success within the predefined range as projects having a same lineage of activities;
seventh program instructions to further trace the activity lineage from the multiple projects based on a specific mathematical formula, wherein the specific mathematical formula was used in one or more activities during a creation of a same final product by each of the multiple projects; and
eighth program instructions to further identify the multiple projects that created the same final product based on a traced activity lineage of activities that used the specific mathematical formula; and wherein the first, second, third, fourth, fifth, sixth, seventh, and eighth program instructions are stored on the computer readable storage medium for execution by the processor via the computer readable memory.

\* \* \* \* \*